United States Patent [19]
Tran

[11] Patent Number: 6,141,235
[45] Date of Patent: Oct. 31, 2000

[54] STACKED CACHE MEMORY SYSTEM AND METHOD

[75] Inventor: Hiep V. Tran, Dallas, Tex.

[73] Assignee: Texas Instruments Incorporated, Dallas, Tex.

[21] Appl. No.: 09/363,861

[22] Filed: Jul. 29, 1999

Related U.S. Application Data

[60] Provisional application No. 60/096,701, Jul. 31, 1998.

[51] Int. Cl.$^7$ .................................................. G11C 15/00
[52] U.S. Cl. ............................................................ 365/49
[58] Field of Search ........................ 365/49, 154, 189.02; 711/122

[56] References Cited

U.S. PATENT DOCUMENTS

| | | | |
|---|---|---|---|
| 4,825,413 | 4/1989 | Tran | 365/189 |
| 4,862,421 | 8/1989 | Tran | 365/189.07 |
| 4,939,693 | 7/1990 | Tran | 365/190 |
| 4,961,168 | 10/1990 | Tran | 365/189.11 |
| 4,984,196 | 1/1991 | Tran et al. | 365/51 |
| 4,991,141 | 2/1991 | Tran | 365/207 |
| 5,091,879 | 2/1992 | Tran | 365/177 |
| 5,093,806 | 3/1992 | Tran | 365/189.11 |
| 5,226,009 | 7/1993 | Arimoto | 365/189.04 |
| 5,291,444 | 3/1994 | Scott et al. | 365/189.05 |
| 5,550,777 | 8/1996 | Tran | 365/205 |
| 5,588,130 | 12/1996 | Fujishima et al. | 395/445 |
| 5,638,317 | 6/1997 | Tran | 365/63 |
| 5,829,026 | 10/1998 | Leung et al. | 711/122 |
| 5,943,284 | 8/1999 | Mizuno et al. | 365/230.03 |

OTHER PUBLICATIONS

S. Narita, K. Ishibashi, S. Tachibana, K. Norisue, Y. Shimazaki, J. Nishimoto, K. Uchiyama, T. Nakazawa, K. Hirose, I. Kudoh, R. Izawa, S. Matsui, S. Yoshioka, M. Yamamoto, I. Kawasaki, "A low–power single–chip microprocessor with multiple page–size MMU for nomadic computing," 1995 Symposium on VLSI Circuits Digest of Technical Papers, pp. 59–60 (Month unavailable).

*Primary Examiner*—Richard Elms
*Assistant Examiner*—Anh Phung
*Attorney, Agent, or Firm*—Robby T. Holland; Wade James Brady, III; Frederick J. Telecky, Jr.

[57] ABSTRACT

A stacked cache memory system and method is provided. The stacked cache memory system (10) may include a memory cell array (22) coupled to a cache system (30). The memory cell array (22) stores and retrieves a data signal. Recently retrieved data signals are stored in a number of sense-amp memory cells (52) within the cache system (30). A column select system (32) is coupled to the cache system (30). A logic subsystem (12) controls the column select system (32) such that the column select system (32) directs the data signal from the memory cell array (22) to a sense-amp system (34) or directs a stored data output signal from the cache system (30) to a switching system (36). The sense-amp system (34) senses and amplifies the data signal and produces an amplified data output signal. The switching system (36) is coupled to the sense-amp system (34) and the cache system (30) and operates to select between the amplified data output signal from the sense-amp system (34) and the stored data output signal from the cache system (30).

17 Claims, 2 Drawing Sheets

STACKED CACHE MEMORY SYSTEM AND METHOD

This application claims priority under 35 USC §119(e)(1) of provisional application Ser. No. 60/096,701 filed Jul. 31,1998.

TECHNICAL FIELD OF THE INVENTION

The present invention relates generally to memory systems, and more particularly to a stacked cache memory system and method.

BACKGROUND OF THE INVENTION

Memory systems are used in nearly all microprocessor and digital equipment applications. Memory systems generally utilize different types of memory for different applications. Memory systems generally include a memory array that has a large number of memory cells arranged in an array of rows and columns. Each memory cell has a specific address that corresponds to its respective row and column. Retrieving data from an individual memory cell is generally accomplished by activating the respective row of memory cells and then reading only the respective column to obtain the data in the memory cell.

The power required to operate the memory system is a primary concern in most applications. For example, in limited power applications, such as a battery powered laptop computer, power requirements are of critical importance. One type of memory system often used in microprocessor applications is a static random access memory (SRAM) system.

SRAM systems comprise a memory cell array composed of SRAM memory cells. A wordline is associated with each row of SRAM memory cells, and a pair of bitlines are associated with each column of SRAM memory cells. Each SRAM memory cell includes a pair of complementary ports, with each port coupled to one of two bitlines dedicated to that column of SRAM memory cells.

When writing, or storing data, in a SRAM memory cell, the appropriate wordline is activated, thereby activating the entire row of memory cells in the SRAM memory cell array. A differential current is applied to the appropriate complementary bitlines that connect to each respective port of the SRAM memory cell. The SRAM memory cell is then latched to a specific logic state with a logic high indicated on one port and a logic low indicated on the other port. When reading from a SRAM system, the appropriate wordline is activated and the logic states on the bitlines associated with the memory cell are differentially sensed using a sense amplifier. The sense amplifier outputs an amplified data output signal that corresponds to the logic state written to the memory cell.

Activating the SRAM memory cells to retrieve the stored data requires time and uses power. Time and power are each valuable commodities in a memory system and must be minimized.

SUMMARY OF THE INVENTION

Accordingly, a need has arisen in the art for an improved memory system. The present invention provides a stacked cache memory system and method that substantially eliminates or reduces problems associated with prior systems and methods.

In accordance with one embodiment of the present invention, the stacked cache memory system comprises a memory cell array that has a number of memory cells arranged in rows and columns. Each memory cell in the memory cell array is operable to store and output a data signal. A cache system has a cache memory cell that is coupled to each column of memory cells in the memory cell array. The cache system operates to store recently output data signals from each column of memory cells and output the data signals. The cache system also operates to output a stored data output signal that corresponds to a previously stored data signal. A column select system is coupled to the cache system. The column select system operates to select and output a single data signal or a single stored output data signal that corresponds to a specific column. A sense-amp system is coupled to the column select system. The sense-amp system operates to sense and amplify the selected data signal from the column select system and output an amplified data output signal. A switching system is coupled to the cache system and the sense-amp system, the switching system operates to output either the amplified data output signal or the stored data output signal.

The present invention provides several technical advantages. For example, the present invention reduces the amount of power used by a memory system in comparison to some conventional memory systems. In limited power applications, such as a battery powered laptop computer, the reduced power requirements of the memory system extend the time that the laptop computer can operate without being recharged.

Another technical advantage of the present invention is that the memory system may have a faster retrieval rate than many conventional memory systems. The present invention does not always require the activation of the memory cell array and amplification of the data signal like some conventional memory systems. Accordingly, the processing speed of the memory system may be increased.

Other technical advantages will be readily apparent to one skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like features, in which.

DETAILED DESCRIPTION OF THE INVENTION

Figure 1:
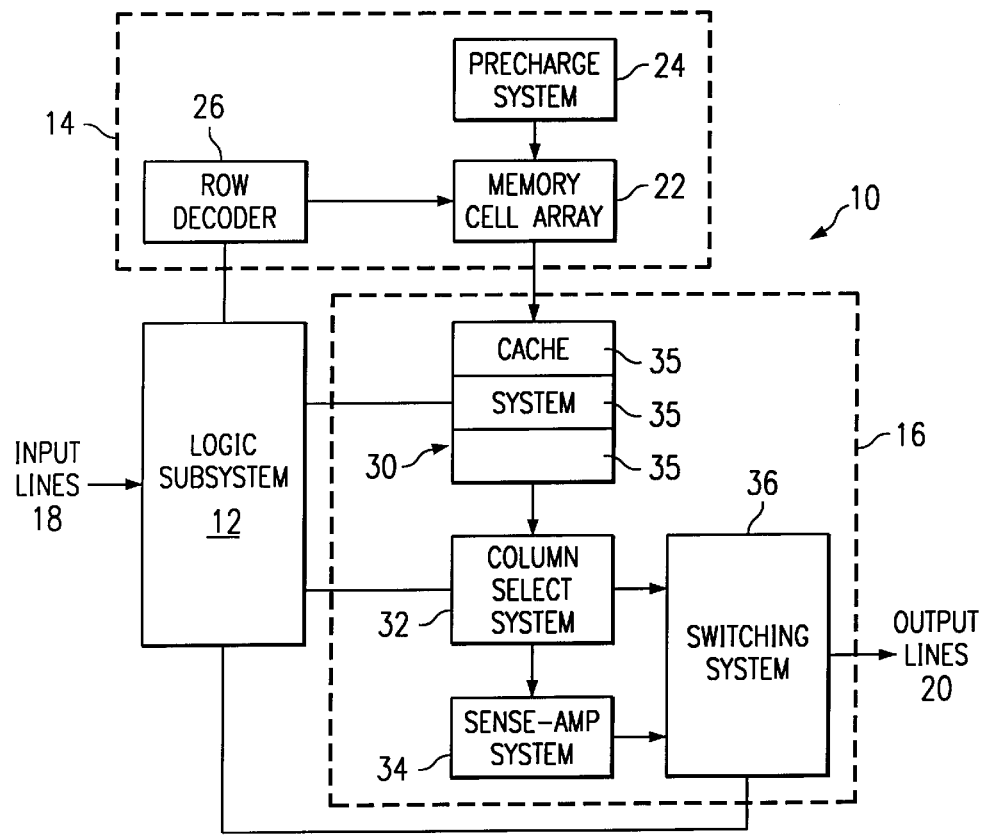
FIG. 1 is a block diagram illustrating a stacked cache memory system in accordance with the present invention.
Figure 3:
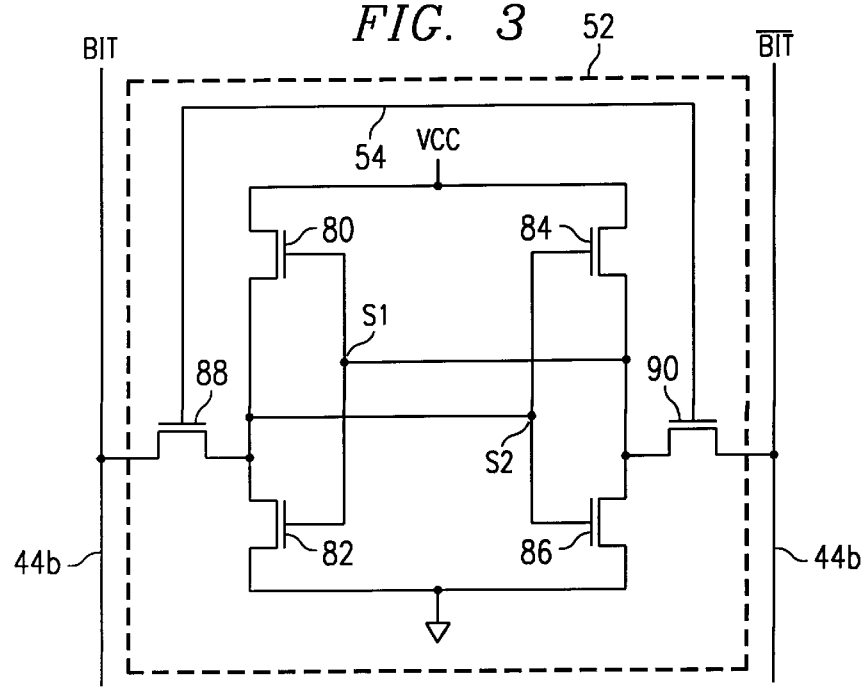
FIG. 3 is a schematic diagram of a cache memory cell in accordance with the present invention.
Figure 2:
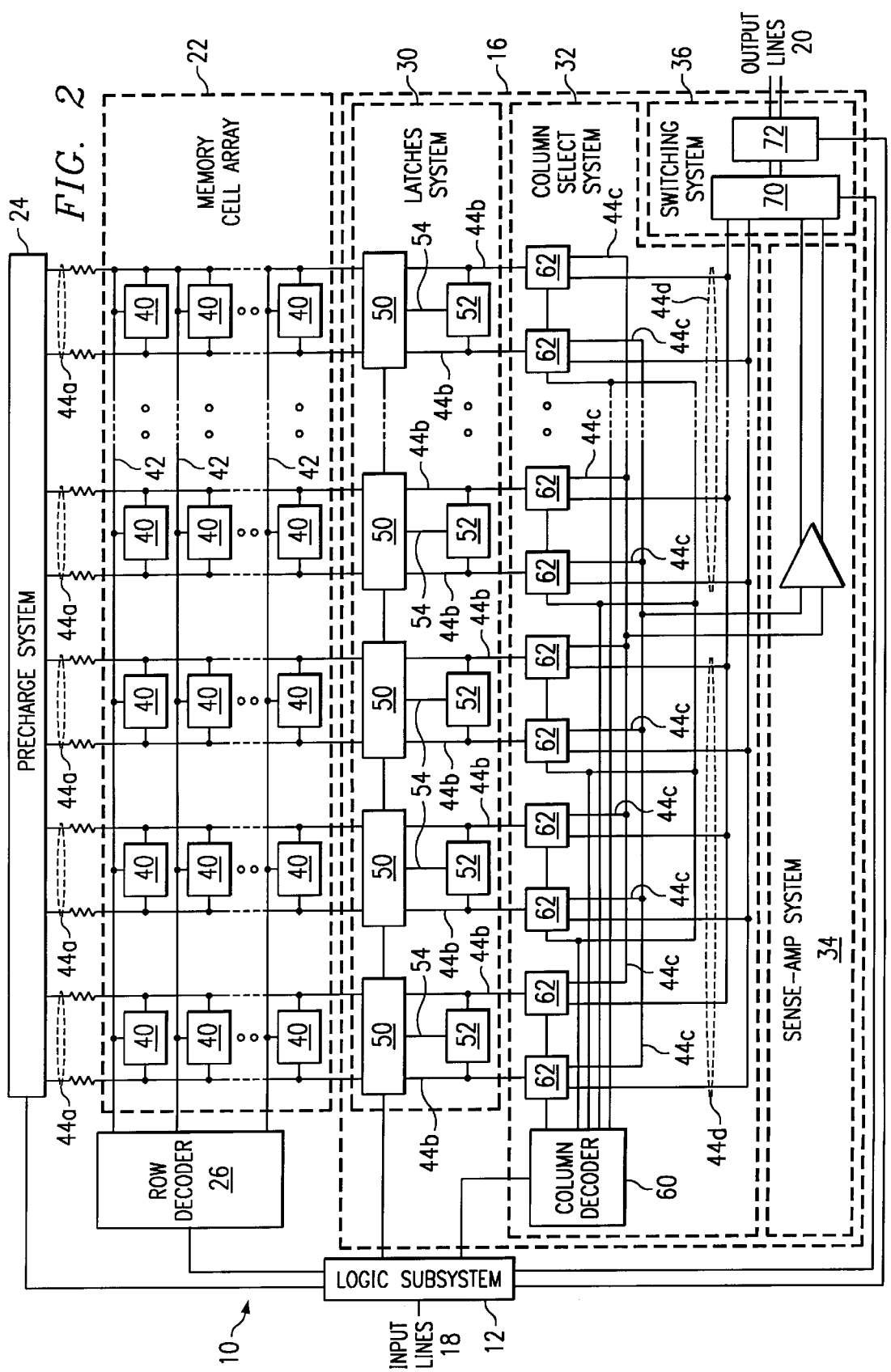
FIG. 2 is a schematic diagram illustrating a stacked cache memory system in accordance with the present invention.

FIGS. 1 through 3 illustrate a stacked cache memory system in accordance with the present invention. Although the present invention is described in terms of a static random access memory (SRAM) system, the present invention may be used in other suitable types of memory systems, such as dynamic random access memory (DRAM) systems, 1T DRAM systems, 4T SRAM systems, and other suitable memory systems.

As described in more detail below, the stacked cache memory system includes a memory cell array, a cache system, and a sense-amp system. The memory cell array includes a number of memory cells arranged in rows and columns. The cache system comprises at least one cache level that has a cache memory cell associated with each column of memory cells in the memory cell array. Each time a row of memory cells in the memory cell array is activated to retrieve a data signal stored in a specific memory cell, each cache memory cell corresponding to a column of memory cells stores the data signal from the corresponding memory cell in the memory cell array. Thus, the cache system temporarily stores the data signals from the most recently accessed row of memory cells. When a data signal from a row that is not stored in the cache system is requested, the memory cell array is activated to retrieve the data signal, and the data signal is directed through the sense-amp system to obtain an amplified data signal. When a data signal from a row that has been stored in the cache system is requested, the data is obtained directly from the cache system without the need to activate the memory cell array or the sense-amp system. Power consumption is thereby reduced by reducing the number of times that the memory cell array and the sense-amp system is activated. In addition, the average time required to retrieve a data signal from the memory cell array is reduced, thereby increasing the processing speed of the memory system.

FIG. 1 is a block diagram illustrating a stacked cache memory system 10 in accordance with one embodiment of the present invention. In the embodiment illustrated in FIG. 1, the memory system 10 includes a logic subsystem 12, a memory array subsystem 14, and a control subsystem 16. Input lines 18 and output 20 lines are coupled to the memory system 10. The input lines 18 and output lines 20 allow command and data communication between the memory system 10 and the other system components (not expressly shown). The logic subsystem 12 controls the operation of the memory array subsystem 14 and the control subsystem 16. As will be discussed in greater detail below, the memory array subsystem 14 operates as a mass memory device and the control subsystem 16 operates both as an amplifier and temporary memory. The memory system 10 may include other suitable components and devices without departing from the scope of the present invention.

In one embodiment, the memory array subsystem 14 comprises a memory cell array 22, a precharge system 24, and a row decoder 26. As will be discussed in greater detail below, the memory cell array 22 generally comprises an array of memory cells arranged in rows and columns. Each row and column of memory cells has an associated address that identifies the specific row and column such that every memory cell in the memory cell array 22 can be identified by its row and column address. Each memory cell in the memory cell array 22 operates to store a logic state of a data signal. In other words, the memory cell stores a charge that is associated with the logic state of "0" or "1."

The precharge system 24 is coupled to the logic subsystem 12 and the memory cell array 22. The precharge system 24 operates to precharge the memory cells within the memory cell array 22. In one embodiment, the precharge system 24 is a bank of pull-up transistors (not expressly shown). In this embodiment, the bank of pull-up transistors receives clocked input data from the logic subsystem 12. It will be understood that the precharge system 24 may include other suitable devices or systems depending on the type of the memory cell array 22 used in the memory system 10.

The row decoder 26 is coupled to the logic subsystem 12 and the memory cell array 22. The row decoder 26 operates to activate a specific row of memory cells within the memory cell array 22 in response to a command from the logic subsystem 12. In particular, the row decoder 26 receives address information from the logic subsystem 12. The address information identifies a specific row in the memory cell array 22 to be selected. The row may be selected for either a read or write operation. The total number of individual memory cells activated depends on the size of the memory cell array 22. For example, in a typical 1 M memory array, the memory cell array 22 may be organized into 512 rows and 2048 columns. In this example, selecting any row activates 2048 memory cells and produces a data signal from each of the 2048 columns of memory cells.

The memory array subsystem 14 may include other suitable devices and systems without departing from the scope of the present invention. For example, in an embodiment utilizing dynamic random access memory (DRAM), the memory array subsystem 14 may incorporate a refresh system (not shown) that refreshes the charge stored within each memory cell of the memory cell array 22.

The control subsystem 16, as illustrated in FIG. 1, includes a cache system 30, a column select system 32, a sense-amp system 34, and a switching system 36. The cache system 30 is coupled to the memory cell array 22, the logic system 12, and the column select system 32. As will be discussed in greater detail below, the cache system 30 operates to receive and temporarily store the data signals from each column of memory cells in the memory cell array 22.

In one embodiment, the cache system 30 comprises a single cache level 35. In this embodiment, the cache system 30 stores only the most recent set of data signals from the memory cell array 22 and discards the previously stored set of data signals. In another embodiment, the cache system 30 comprises multiple cache levels 35 that allow more than a single set of data signals to be stored in the cache system 30. In this embodiment, each cache level 35 stores the data signals from a recently accessed row of memory cells. For example, the cache system 30 may comprise five cache levels 35 that allow the cache system 30 to store the five sets of data signals that correspond to the five most recent times the memory cell array 22 has been accessed. It will be understood that the cache system 30 may comprise any suitable number of cache levels 35 without departing from the scope of the present invention.

The column select system 32 is coupled to the cache system 30, the logic subsystem 12, the sense-amp system 34, and the switching system 36. The column select system 32 operates as a switching system that switches the data signal between the switching system 36 and the sense-amp system 34. Specifically, when the information requested from the memory system 10 has a row address that is the same as the address of a row that is stored in the cache system 30, the cache system 30 is activated and stored data output signal is communicated to the column select system 32. The column select system 32 directs the appropriate stored data output signal to the switching system 36. When the information requested from the memory system 10 has a row address that is not the same as the rows stored in the cache system 30, the memory cell array 22 is activated and the data signal is stored in the cache system 30 and communicated to the column select system 32, which directs the appropriate data signal to the sense-amp system 34.

The sense-amp system 34 is generally required only in SRAM applications. The sense-amp system 34 is coupled to the column select system 32 and the switching system 36.

The sense-amp system 34 operates to sense the data signal switched from the memory cell array 22, and produce an amplified data output signal that is then directed to the switching system 36.

The switching system 36 is coupled to the column select system 32, the sense-amp system 34, the logic subsystem 12, and the output lines 20. As will be described in greater detail below, the switching system 36 switches between the output of the column select system 32 and the sense-amp system 34. In other words the switching system 36 couples the output lines 20 to the column select system 32 when the cache system 30 contains the requested information so that the stored data output signal corresponding to the requested information is output on the output lines 20. Correspondingly, the switching system 36 couples the output lines 20 to the sense-amp system 34 when the cache system 30 does not contain the requested information so that the amplified data output signal from the sense-amp system 34 is output on the output lines 20.

As will be described in greater detail below, the switching system 36 may also comprise one or more memory output cells that operate to save the most recently retrieved data output signals. For example, the switching system 36 may comprise ten memory output cells such that store the ten most recent data output signals retrieved from the memory system 10. In this example, when the logic system 12 determines that the requested data signal is contained in the switching system 36, a missing data output signal from the appropriate memory output cell is switched to the output lines 20 without the other components of the memory system 10 being activated.

The logic subsystem 12 is coupled to the memory array subsystem 14, the cache system 30, the column select system 32, and the switching system 36, as well as the input lines 18. The logic subsystem 12 receives command signals and data signals on the input lines 18. In response to the command and data signals, the logic subsystem 12 controls the operation of the individual components within the memory system 10 to either store or access data signals in the memory array subsystem 14 or the control subsystem 16.

In particular, when the logic subsystem 12 receives a command signal to read, or access, a data signal stored in the memory array subsystem 14, the logic subsystem 12 determines whether or not the requested data signal is temporarily stored in the cache system 30. If the cache system 30 contains the requested data signal, the logic. subsystem 12 activates the cache system 30 and the column select system 32 to direct the requested stored data output signal from the cache system 30 to the switching system 36. The logic subsystem 12 communicates with the switching system 36 to direct the requested data output signal from the column select system 32 to the output lines 20. If the cache system 30 does not contain the requested data signal, the logic subsystem 12 communicates with the row decoder 26 to activate the particular row containing the requested data signal. The data signal contained in each memory cell in the row of memory cells is communicated to the cache system 30. The logic subsystem 12 controls the cache system 30 such that the data signals from the entire row are temporarily stored in the cache system 30. The logic subsystem 12 also controls the switching system 36 such that the data output signal from the requested column in the memory cell array 22 is directed to the sense-amp system 34. As discussed previously, the sense-amp system 34 senses the data signal from the memory cell array 22 and produces an amplified data output signal. The amplified data output signal is then directed to the switching system 36. The logic subsystem 12 controls the switching system 36 such that the amplified data signal is then directed to the output lines 20. It will be understood that the logic subsystem 12 may perform other suitable functions without departing from the scope of the present invention.

FIG. 2 is a schematic diagram illustrating one embodiment of the stacked cache memory system 10 illustrated in FIG. 1. The memory cell array 22 comprises a number of memory cells 40 arranged in an array of rows and columns. In the embodiment illustrated, the memory cells 40 are static random access memory (SRAM) cells constructed according to conventional principles of cross-coupled inverter realization. It will be understood that the memory cells 40 may be otherwise suitably constructed without departing from the scope of the present invention.

A wordline 42 is associated with each row of memory cells 40 and couples each memory cell 40 within the row to the row decoder 26. A complementary pair of bitlines 44*a* is associated with each column of memory cells 40. The bitlines 44*a* couple each memory cell 40 in each column to the precharge system 24 and the cache system 30. The complementary bitlines 44*a* are generally referred to as BIT and bit. In this embodiment, the data signal communicated on bitlines 44*a* is a complementary voltage. In other words, when BIT has a voltage corresponding to a logic state of "0," bit will have a voltage corresponding to a logic state of "1."

Although the cache system 30 may comprise one or more cache levels 35, FIG. 2 only illustrates a single cache level 35. Each cache level 35 comprises a number of control switches 50 and a number of cache memory cells 52. In one embodiment, a control switch 50 is coupled to each set of bitlines 44*a*. A set of bitlines 44*b* are coupled from each control switch 50 to a respective cache memory cell 52 and to the column select system 32. A control line 54 also couples the control switch 50 to the cache memory cell 52. The control switches 50 are coupled to the logic subsystem 12. The control switch 50 operates to switch the data signals from the bitlines 44*a* to the bitlines 44*b*. In this embodiment, the control switch 50 also controls the operation of the respective cache memory cell 52. It will be understood that the control switches 50 may comprise other suitable devices without departing from the scope of the present invention.

As will be described in greater detail below, each cache memory cell 52 operates to sense the differential current voltage on the bitlines 44*b* and store a data output signal corresponding to the sensed differential current. The stored data output signal in the cache memory cell 52 is output to the bitlines 44*b*. In a particular embodiment, the stored data output signal does not require amplification. In another embodiment, the stored data output signal must be amplified by the sense-amp system 34. It will be understood that the cache system 30 may comprise other suitable devices without departing from the scope of the present invention.

The column select system 32 comprises a column decoder 60 and a number of column control switches 62. The column decoder 60 is coupled to the logic subsystem 12 and operates to receive and decode column address information. Each bitline column control switch 62 is coupled to the cache system 30 by bitlines 44*b*. In one embodiment, each column control switch 62 is coupled to the sense-amp system 34 and the switching system 36 by bitlines 44*c* and 44*d*, respectively.

The column control switch 62 switches either the data signal from the corresponding bitline 44*b* to bitlines 44*c* and the sense-amp system 34, or the stored data output signal to bitlines 44*d* and the switching system 36, depending upon whether the cache system 30 contains the requested data signal. Specifically, when the cache system 30 contains the requested data signal, the cache memory cell 52 containing the requested data signal is activated and the stored data output signal is communicated on bitlines 44b to the column control switches 62. The column control switch 62 corresponding to the column address of the requested data signal switches the stored data output signal to bitlines 44d and the switching system 36.

In contrast, when the cache system 30 does not contain the requested data signal, the memory cell array 22 is activated and the cache memory cells 52 store the data signal from each column of the memory cells 40. In addition, the data signal is also communicated over bitlines 44b to the column control switches 62. The column control switch 62 corresponding to the column address of the requested data signal switches the data signal from bitlines 44b to bitlines 44c and the sense-amp system 34. It will be understood that the column select system 32 may comprise other suitable devices without departing from the scope of the present invention.

The sense-amp system 34 is coupled to the column select system 32 and the switching system 36. In this embodiment, the sense-amp system 34 comprises a number of sense amplifiers (not expressly shown). As discussed previously, the sense-amp system 34 senses a differential current between the complementary bitlines 44c and produces an amplified data output signal based on the sensed differential current. The amplified data output signal from the sense-amp system 34 is communicated to the switching system 36. It will be understood that other types of suitable memory systems 10 do not require the data signal to be sensed and amplified prior to being output, it will be understood that the scope of the present invention encompasses such suitable memory systems.

The switching system 36 is coupled to the logic subsystem 12, the column select system 32, the sense-amp system 34, and the other system components (not expressly shown) by output lines 20. In one embodiment, the switching system 36 comprises an output switch 70 and an output memory cache 72. The output switch 70 is coupled to the column control switches 62 and the sense-amp system 34. The output switch 70 switches between the amplified data output signal from the sense-amp system 34 or the stored data output signal from column control switches 62. The output from the output switch 70 is communicated to the optional output memory cache 72. The output memory cache 72 comprises one or more output memory cells (not expressly shown) that store the most recent data output signals. The output memory cache 72 operates in a similar manner to the cache system 30. The output memory cache 72 stores the most recent data output signals that correspond to the most recent row and column addresses accessed. When the row and column address of a requested data signal is the same as stored in the output memory cache 72, is activated and a memory data output signal is produced that is communicated over the output lines 20. The other components of the stocked cache memory system 10 are not activated. It will be understood that the switching system 36 may comprise other suitable devices and systems without departing from the scope of the present invention.

FIG. 3 is a schematic diagram of one embodiment of the cache memory cell 52. In the embodiment illustrated, the cache memory cell 52 is a latch type memory circuit constructed in accordance with cross-coupled inverter realization. In one embodiment, the cache memory cell 52 comprises a first and a second CMOS inverter. The first CMOS inverter comprises a P-channel transistor 80 and an N-channel transistor 82 having their source-to-drain paths coupled in series between a voltage source VCC and a ground, as well as having their respective gates tied together. The second CMOS inverter comprises a P-channel transistor 84 and an N-channel transistor 86 having their source-to-drain paths coupled in series between VCC and ground, as well as having their respective gates tied together. The invertors are cross-coupled by coupling the gates of transistors 80 and 82 to the drains of transistors 84 and 86 to form node S, and by the gates of transistors 84 and 86 being coupled to the drains of transistors 80 and 82 to form node S2. A first N-channel pass transistor 88 has its source-to-drain path coupled between node S1 and BIT bitline 44b, and has its gate coupled to the control line 54. A second N-channel pass transistor 90 has its source-to-drain path coupled between node S2 and BIT(not) bitline 44b, and its gate coupled to the control line 54.

In the embodiment illustrated, the cache memory cells 52 form hard latches that produce a data output signal that does not require amplification. In another embodiment, the cache memory cells 52 may be a soft latch that requires amplification. In this embodiment, the stored data signal from the cache memory cell 52 may be communicated through the sense-amp system 34 prior to being output over the output lines 20. Although the cache memory cell 52 is described in terms of a latches type memory circuit, other suitable types of memory circuits may used without departing from the scope of the invention.

In operation, the cache memory cell 52 operates in a manner similar to the memory cells 40 used in the memory cell array 22. The read/write function of the cache memory cell 52 is controlled by the control switch 50.

Although the present invention has been described in several embodiments, various changes and modifications may be suggested to one skilled in the art. It is intended that the present invention encompass such changes and modifications that fall within the scope of the appended claims.

What is claimed is:

1. A stacked cache memory system comprising:
 a cache system comprising at least one cache memory cell coupled to a memory cell array, the cache system outputting at least one stored data output signal that corresponds to previously stored data from the memory cell array;
 a column select system coupled to the cache system, the column select system operable to select at least one data signal from the memory cell array or at least one stored output data signal from the cache system;
 a sense-amp system coupled to the column select system, the sense-amp system operable to sense and amplify the at least one data signal from the memory cell array selected by the column select system, and output an amplified data output signal; and
 a switching system coupled to the cache system and the sense-amp system, the switching system coupling at least one output line to the sense-amp system by a first data path to output the amplified data output signal and coupling the at least one output line to the column select system by a second data path to output the stored output data signal.

2. The stacked cache memory system of claim 1, wherein the cache system comprises a plurality of cache levels.

3. The stacked cache memory system of claim 1, wherein each cache memory cell comprises a latch type circuit.

4. The stacked cache memory system of claim 1, wherein the switching system comprises an output memory cache.

5. The stacked cache memory system of claim 1, wherein the memory cell array comprises a plurality of static random access memory (SRAM) cells.

6. The stacked cache memory system of claim 1, wherein the sense-amp system comprises at least one sense-amp.

7. An electronic device comprising, a stacked cache memory system, the stacked cache memory system comprising:

a memory cell array comprising a plurality of memory cells arranged in rows and columns with each memory cell operable to store and output a data signal;

a cache system comprising a cache memory cell coupled to each column of memory cells, the cache system operable to store the recently output data signals from each column of memory cells and output the data signals, the cache system also operable to output a stored data output signal that corresponds to a previously stored data signal;

a column select system coupled to the cache system, the column select system operable to select a single data signal or a single stored output data signal that corresponds to a specific column;

a sense-amp system coupled to the column select system, the sense-amp system operable to sense and amplify the selected data signal from the column select system and output an amplified data output signal; and a switching system coupled to the cache system and the sense-amp system, the switching system coupling at least one output line to the sense-amp system to output the amplified data output signal and coupling the at least one output line to the column select system to output the stored output data signal.

8. The electronic device of claim 7, wherein the cache system comprises a plurality of cache levels.

9. The electronic device of claim 7, wherein each cache memory cell comprises a latch type circuit.

10. The electronic device of claim 7, wherein the switching system comprises an output memory cache.

11. The electronic device of claim 7, wherein the memory cell array comprises a plurality of static random access memory (SRAM) cells.

12. The electronic device of claim 7, wherein the sense-amp system comprises at least one sense-amp.

13. A method of storing and retrieving information comprising:

providing a memory cell array comprising a plurality of memory cells arranged in rows and columns with each memory cell operable to store and output a data [signal] value;

storing data values in the memory cell array with each data value having an address that corresponds to the row and column of the memory cell that the data value is stored within;

providing a cache system coupled to each column of memory cells, the cache system operable to either store each of the recently output data values from each column of memory cells and output the data values, or output a stored data output value that corresponds to a previously stored data value;

receiving a request for a data value; and determining whether the requested data value is stored in the cache system, when the requested data value is stored in the cache system then a stored data output value is output over an output line by a first data path, otherwise, the requested data value is obtained from the memory cell array and output over the output line by a second data path that is different than the first data path.

14. The method of claim 13, further comprising:

providing an output cache memory operable to store recently output amplified data output signals and stored data output signals;

determining whether the requested data signal is stored in the output cache memory, when the requested data signal is stored in the output cache memory then a memory data output signal is output over the output line.

15. The method of claim 13, wherein the memory cells are static random access memory (SRAM) cells.

16. The method of claim 13, wherein the cache system comprises a plurality of cache levels.

17. The method of claim 13, wherein each memory cell comprises a latch type circuit.

* * * * *